(12) United States Patent
Laluet et al.

(10) Patent No.: US 11,060,675 B2
(45) Date of Patent: Jul. 13, 2021

(54) ACOUSTIC AND ILLUMINATING CEILING PANEL

(71) Applicant: SAINT-GOBAIN ECOPHON AB, Hyllinge (SE)

(72) Inventors: Jean-Yves Laluet, Paris (FR); Pierre Chigot, Helsingborg (SE)

(73) Assignee: SAINT-GOBAIN ECOPHON AB, Hyllinge (SE)

( * ) Notice: Subject to any disclaimer, the term of this patent is extended or adjusted under 35 U.S.C. 154(b) by 55 days.

(21) Appl. No.: 16/467,638

(22) PCT Filed: Dec. 8, 2017

(86) PCT No.: PCT/EP2017/082051
§ 371 (c)(1),
(2) Date: Jun. 7, 2019

(87) PCT Pub. No.: WO2018/104525
PCT Pub. Date: Jun. 14, 2018

(65) Prior Publication Data
US 2020/0103084 A1    Apr. 2, 2020

(30) Foreign Application Priority Data
Dec. 8, 2016 (FR) ..................... 16/01748

(51) Int. Cl.
*F21S 8/02* (2006.01)
*E04B 9/00* (2006.01)
(Continued)

(52) U.S. Cl.
CPC .............. *F21S 8/026* (2013.01); *E04B 9/001* (2013.01); *E04B 9/04* (2013.01); *E04B 9/0435* (2013.01);
(Continued)

(58) Field of Classification Search
CPC .. F21S 8/026; E04B 9/001; E04B 9/04; E04B 9/0435; E04B 9/28; E04B 9/32; G10K 11/162; F21Y 2115/15; F21V 23/001
See application file for complete search history.

(56) References Cited

U.S. PATENT DOCUMENTS 10,344,954 B1 * 7/2019 Tischler .............. H01R 25/142
2002/0141181 A1 * 10/2002 Bailey ...................... F21S 2/00
                                                                    362/150
(Continued)

FOREIGN PATENT DOCUMENTS

EP         2 573 461 A1    3/2013
WO   WO 2010/038946 A2    4/2010
(Continued)

OTHER PUBLICATIONS

International Search Report as issued in International Patent Application No. PCT/EP2017/082051, dated Mar. 14, 2018.

*Primary Examiner* — Erin Kryukova
(74) *Attorney, Agent, or Firm* — Pillsbury Winthrop Shaw Pittman LLP

(57) ABSTRACT

An acoustic and illuminating ceiling panel includes a layer of acoustic absorbent material, the layer including a main inner face intended to be pointed toward the inside of the room, and light sources on the main inner face that is optionally covered by a voile fabric and/or coated, with a paint, wherein the light sources include organic light-emitting diode (OLED) modules with a luminous efficacy greater than or equal to 60 lm/W, and wherein a number and size of the OLED modules are adapted so that the ceiling panel provides an acoustic absorption coefficient αw greater than or equal to 0.7.

20 Claims, 8 Drawing Sheets

(51) Int. Cl.
*E04B 9/04* (2006.01)
*E04B 9/28* (2006.01)
*E04B 9/32* (2006.01)
*F21V 23/00* (2015.01)
*G10K 11/162* (2006.01)
*F21Y 115/15* (2016.01)

(52) U.S. Cl.
CPC ............... *E04B 9/28* (2013.01); *E04B 9/32* (2013.01); *F21V 23/001* (2013.01); *G10K 11/162* (2013.01); *F21Y 2115/15* (2016.08)

(56) References Cited

U.S. PATENT DOCUMENTS

| | | | | |
|---|---|---|---|---|
| 2004/0070967 | A1* | 4/2004 | Kennedy | H04R 1/028 362/147 |
| 2005/0248935 | A1* | 11/2005 | Strip | H01L 27/3293 362/145 |
| 2010/0046210 | A1* | 2/2010 | Mathai | E04B 9/241 362/147 |
| 2010/0076527 | A1* | 3/2010 | Hammond | G09F 9/33 607/88 |
| 2010/0284185 | A1* | 11/2010 | Ngai | E04B 9/0464 362/235 |
| 2012/0153320 | A1* | 6/2012 | Gaertner | H01L 27/3211 257/89 |
| 2012/0250296 | A1* | 10/2012 | Lu | F21S 8/046 362/147 |
| 2014/0049956 | A1* | 2/2014 | Manahan | F21V 23/04 362/233 |
| 2014/0124291 | A1* | 5/2014 | Dugan | E04C 2/043 181/290 |
| 2015/0008070 | A1* | 1/2015 | Caimi | E04B 1/86 181/290 |
| 2015/0300583 | A1* | 10/2015 | McCanless | G02B 6/0045 362/145 |
| 2016/0178146 | A1* | 6/2016 | Oleske | E04B 9/0421 52/28 |

FOREIGN PATENT DOCUMENTS

| | | | | |
|---|---|---|---|---|
| WO | WO-2013024388 | A1 * | 2/2013 | ............ H04B 5/0037 |
| WO | WO-2016122400 | A1 * | 8/2016 | ............ A41D 13/01 |
| WO | WO-2017083181 | A1 * | 5/2017 | ............ E04B 9/04 |

* cited by examiner

| Flux per panel (lm) | 675 | 600 | 525 | 450 | 375 | 300 |
|---|---|---|---|---|---|---|
| Degree of coverage of a ceiling (%) | Illumination (lux) | | | | | |
| 10 | 136 | 120 | 105 | 90 | 75 | 60 |
| 20 | 271 | 241 | 211 | 181 | 151 | 120 |
| 30 | 407 | 361 | 316 | 271 | 226 | 181 |
| 40 | 542 | 482 | 422 | 361 | 301 | 241 |
| 50 | 678 | 602 | 527 | 452 | 376 | 301 |
| 60 | 813 | 723 | 632 | 542 | 452 | 361 |
| 70 | 949 | 843 | 738 | 632 | 527 | 422 |
| 80 | 1084 | 964 | 843 | 723 | 602 | 482 |
| 90 | 1220 | 1084 | 949 | 813 | 678 | 542 |
| 100 | 1355 | 1204 | 1054 | 903 | 753 | 602 |

Figure 8

ACOUSTIC AND ILLUMINATING CEILING PANEL

CROSS-REFERENCE TO RELATED APPLICATIONS

This application is the U.S. National Stage of PCT/EP2017/082051, filed Dec. 8, 2017, which in turn claims priority to French patent application number 16/01748 filed Dec. 8, 2016. The content of these applications are incorporated herein by reference in their entireties.

The present invention relates to an illuminating and acoustic ceiling panel.

In the fields of architecture and interior design, it is customary to use panels to cover the ceiling of a room. These elements may have an esthetic function. They may also be used to actively modify the properties of the room, in particular its acoustic properties, as is the case for example with the SOLO™ or FOCUS™ fibreglass panels sold by the company ECOPHON.

For this purpose, the objective of the invention is to add a new lighting functionality to an acoustic ceiling panel.

For this purpose, one subject of the present invention is an acoustic and illuminating ceiling panel comprising a layer of acoustic absorbent material, the layer comprising a main inner face intended to be pointed toward the inside of the room, and light sources on the inner face that is optionally covered by a voile fabric and/or coated with a paint. Moreover, said light sources comprise organic light-emitting diode modules referred to as OLED modules preferably with a luminous efficacy greater than or equal to 60 lm/W.

In the acoustic and illuminating ceiling panel according to the invention, the number and size of the OLED modules are preferably adapted so that the ceiling panel provides an acoustic absorption coefficient $\alpha w$ greater than or equal to 0.7 and preferably the panel complies with class A according to the standard EN ISO 11654.

Within the context of the invention, the acoustic absorption coefficient of an element, which is defined as being the ratio of the sound energy absorbed by the element to the sound energy incident upon the element, is preferably measured according to the international standard EN ISO 354.

The panel according to the invention thus combines the functionalities of lighting and of acoustic correction: the size and arrangement of the OLEDs help to diffuse the sound wave in the voice frequencies. The invention allows an alternating and uniform distribution of the sound absorbers: there are no zones where the acoustics are locally poor owing to the presence of light fittings.

Numerous variants are possible in terms of the distribution of the OLEDs within a panel and the distribution of the panels within the ceiling. There is an interest particularly in configurations that make it possible to achieve 500 lux (lighting level required by the standard at a worktop), 300 lux (traffic zones) or else 800 lux (precision tasks). Thus, one embodiment (9 OLEDs having a luminance at 3000 cd/m² of 100 (mm)×100 (mm) per panel, and 40% degree of coverage of the ceiling) is one of the configurations that makes it possible to achieve a working illumination of 500 lux.

In traffic areas, the same panel can be used (still 9 OLEDs having a luminance at 3000 cd/m² of 100 (mm)×100 (mm) per panel according to the invention), by this time lowering the degree of coverage of the ceiling to between 20% and 30%: an illumination of 300 lux is achieved.

If it is preferred, however, for esthetic reasons, to maintain the same degree of coverage in terms of panels, the panel equipped with 5 to 6 OLEDs of 100 (mm)×100 (mm) having a luminance of 3000 cd/m² with a degree of coverage of 40% makes it possible to achieve an illumination of 300 lux.

Finally, different OLED models exist: their size and luminance may vary from one manufacturer to another. It is therefore also possible to vary the type of OLEDs incorporated in order to achieve a particular stylistic effect, or to further improve the acoustic performance. The preference is for small, well-distributed units. From the point of view of the optical performance, a design based on 9 OLEDs of 100 (mm)×100 (mm) and having a luminance of 3000 cd/m² per tile (panel) is equivalent to 4 OLEDs of 150 (mm)×150 (mm) at 3000 cd/m² per panel or else 36 OLEDs of 50 (mm)×50 (mm) with a luminance at 3000 cd/m² per panel.

The outer face of the panel according to the invention may be covered with an acoustic voile fabric or with a thickness of acoustic material, and thus offer an acoustic correction functionality on the rear face.

In one embodiment, an illumination of 500 lux is generated in a room (typical height 280 cm) at the worktop (typical height 80 cm). For this, a tiling of 600 (mm)×600 (mm) ceiling panels is created, 40% of which are panels according to the invention equipped with 9 OLED light sources (dimensions 10 (mm)×100 (mm), having a luminance of 3000 cd/m², flux 75 lm). From a practical point of view, use is for example made of the N6SA40 OLED sources from LG Chem (100 (mm)×100 (mm), flux 75 lm, 3000 cd/m²).

According to one advantageous embodiment, the OLED modules are in contact via the corners only or preferably are spaced apart from one another.

In one preferred embodiment the combined degree of coverage of said OLED modules is at most 30%, in particular at most 26% and preferably at most 10%.

The OLED modules may be uniformly distributed over the inner face.

The OLED modules advantageously have a luminance of at least 2500 cd/m², in particular at least 3000 cd/m² or else at least 3500 cd/m² and an active surface area of at least 0.02 m² and of at most 0.29 m², better still of at most 0.20 m² and even of at most 0.10 m² and preferably the number of said OLED modules on the panel is at least 5 and at most 50, preferably at most 20 or even 10.

According to one embodiment, the panel comprises a first series of OLED modules, in particular at most 10, or even at most 6 OLED modules, and a second series of OLED modules of smaller active surface area, in particular at least 30% or even at least 50% smaller, in particular at most 10 or even at most 6 OLED modules of the second series.

It is also possible to arrange on the inner face a plurality of inorganic light-emitting diodes referred to as LEDs, which are spaced apart from one another and/or one or more other electronic components, in particular one or more sensors chosen from sensors of one or the following: light, infrared, pressure, temperature, humidity, sound, air quality or any other connected object.

In one embodiment, the inner face comprises a textile (woven or nonwoven textile, but preferably a woven fabric) bearing electrically conductive threads (preferably metallic threads, in particular having a diameter of at most 1 mm) having a low-voltage power supply, in particular of at most 50 V, for said OLED modules and for possible LEDs and/or one or more other electronic components, in particular sensors chosen from sensors of one or the following: light, infrared, pressure, temperature, humidity, sound, air quality and other connected object.

Said OLED modules being on said textile in electrical contact with the electrically conductive threads, they are electrically powered by surface contact.

The textile is in particular permeable to sound waves.

In particular, the electrically conductive threads may be added to the textile and embroidered or sewn (or stitched) on the textile, said OLED modules being on said textile in electrical contact with the electrically conductive threads.

The textile preferably extends beyond all or some of the edge of the panel to conduct electricity up to the edge of the panel.

The electrically conductive threads may be covered, completely or partly, by additional textile threads, in particular which are added by embroidery or sewn, it being possible for the textile threads to form a winding or coil around the electrically conductive threads, the sewing thread passing through the textile support at each point.

In one particular embodiment, the textile comprises at least one reinforcing zone and/or one positioning marker of one of said OLED modules or of any LEDs and/or of one or more other electronic components, in particular sensors chosen from sensors of one or the following: light, infrared, pressure, temperature, humidity, sound, air quality and any other connected object. It is possible to have as many markers as components.

The panel may advantageously comprise a first zone of at least two electrical contacts on a first border of the inner face and extending over a first edge of the panel, in particular the electrical contacts are on said textile which extends beyond all or some of the first edge, and preferably it comprises other zones of at least two electrical contacts on one or all the other borders of the inner face and extending over (one or) other edges of the panel.

In one particular embodiment, the panel comprises at least one reinforcing zone and/or one positioning marker of one of said OLED modules.

The panel may comprise an acoustic or non-acoustic surfacing, preferably an acoustic surfacing, in particular a voile fabric on the so-called outer face on the side opposite the inner face.

Another subject of the invention is an acoustic ceiling comprising acoustic and illuminating ceiling panels according the invention, in particular providing an illumination of at least 300 lux and of at most 900 lux.

In a ceiling according to the invention, the (illuminating or non-illuminating) acoustic panels are generally supported by a framework, in particular a metal framework. For example, the framework may be composed of inverted T-profiles, and the panels rest with their inner face on the horizontal part (bar) of the T. The panels are for example separated (edges spaced apart). As a variant, the panels may each have a notch made along the edge and the panels are inserted onto the horizontal bar of the T, which is received in the notch in the thickness of the panel. This embodiment makes it possible to hide all or part of the framework, in particular metal framework (which assembly is referred to as concealed framework assembly), and provides a better quality esthetic finish. Furthermore, in this case, the edges of the adjacent panels may be in contact (directly or via electrical contacts as described in detail subsequently, etc.).

Another subject of the invention is an acoustic ceiling comprising a plurality of acoustic ceiling panels in particular in a region of the ceiling defined by at least 9 panels or even over the whole of the ceiling, and it comprises acoustic and illuminating ceiling panels according to the invention.

In one embodiment of the acoustic ceiling, two adjacent and separated panels (in particular at least one or both being illuminating as described previously) comprise, on their respective edges that are opposite (one another), electrical contacts that are in electrical connection with a framework (in particular metal framework), which is optionally electrically insulated and that comprises an electrically conductive zone oriented toward the outer face capable of electrically interconnecting said acoustic panels. Specifically, the acoustic panels may be supported by said framework. For example, the framework may be composed of inverted T-profiles, and the two panels rest with their inner face on the horizontal part of the T.

The two separated panels may have a notch made along the edge and the panels inserted onto the horizontal bar of the T, which is received in the notches in the thickness of the panels. This embodiment makes it possible to hide all or part of the framework.

Another subject of the invention is an acoustic ceiling comprising a plurality of acoustic ceiling panels (in particular separated or in contact via the edges), in particular in a so-called reference region of the ceiling defined by at least 9 panels or even over the whole of the ceiling, and the surface occupied by acoustic and illuminating ceiling panels according to the invention is at most 70% of the reference surface and preferably at least 20% of the reference surface and preferably from 30% to 50% of the reference surface.

In one particular embodiment, in this reference region two adjacent and separated panels (in particular at least one or both being according to the invention as described previously) comprise, on their respective edges that are opposite (one another), electrical contacts that are in electrical connection with a framework, in particular a metal framework, which is optionally electrically insulated and that comprises an electrically conductive zone oriented toward the outer face capable of electrically interconnecting said acoustic panels.

An acoustic ceiling according to the invention advantageously provides an illumination of at least 300 lux and of at most 900 lux.

In one embodiment of the ceiling (in particular with the aforementioned concealed framework), the first edge of a first acoustic, preferably illuminating, panel according to the invention is in contact with the second edge of a second acoustic, optionally illuminating, panel according to the invention, in particular in contact with other acoustic, optionally illuminating panels, the first and second edges bearing electrical contacts that form an electrical continuity by contact in particular for the transmission of control, power supply or data signals.

The layer of absorbent material may be a porous insulating material, which is preferably fibrous, based on glass or rock mineral fibers, and/or else organic fibers in particular cellulose or polymer fibers, and sometimes an open-pore foam.

Advantageously, the layer of acoustic absorbent material is based on mineral fibers.

The layer of acoustic absorbent material may preferably be a single layer or even formed of several superimposed layers or strata, it being possible for these layers or strata to be of different compositions or natures.

According to the invention, the layer of acoustic absorbent material may be a so-called "volume" layer having a thickness greater than or equal to 15 mm, preferably greater than or equal to 20 mm, more preferably greater than or equal to 40 mm, such as a panel made of compressed mineral fibers, in particular a panel made of compressed glass fibers or compressed rock fibers. Preferably, the layer of acoustic absorbent material has a thickness greater than or equal to the thickness of the or each OLED module.

So-called 'wet felt' acoustic ceiling panels are based on mineral fibers in general. They can be defined as composite panels based on fibers, generally mineral fibers such as mineral wool fibers, and also cellulose fibers, on a binder and various mineral constituents manufactured from an aqueous suspension.

Each OLED module is for example received in a blind opening made in the thickness of the layer between the inner face and the outer face. The OLED module may be flush with the inner face outside of the notch.

A through-hole in the thickness of the layer may be made for the power supply.

The technical edges of the OLED module are for example at most 1 mm.

The panel is suspended from a building ceiling, with its inner surface pointed toward the inside of the building and its outer surface pointed toward the ceiling.

In one embodiment, the panel with OLED modules according to the invention is suspended from the ceiling in a localized manner, individually, for example above a work station of an occupant of the building while other acoustic absorbent elements from the prior art, with no OLED module, are suspended from the rest of the ceiling.

As a variant, several acoustic panels according to the invention may be distributed regularly or randomly in a room, for example in an office.

It is also possible to vary the distance between each acoustic panel and the ceiling, so as to obtain a three-dimensional distribution of the acoustic absorbent elements on the ceiling.

Another subject of the invention is a ceiling assembly comprising a building ceiling and at least one acoustic absorbent panel as described above, the or each acoustic panel being suspended from the ceiling with its inner surface pointed toward the inside of the building and its outer surface pointed toward the ceiling. Ceiling is understood to mean the lower side of a floor structure exposed in a room.

Rigid or flexible OLED modules may be chosen.

OLED modules may be chosen that are separated and (just) in contact via the corners and preferably at the center of the panel (Lambertian source preferably emitting in the white), for example that are rectangular (square), preferably of less than 20 cm by less than 20 cm.

Each (in particular rectangular) panel may comprise OLED modules in one or two sizes, for example 10 cm by 10 cm and 5 cm by 5 cm and even also LEDs and even a control unit which is for example mains powered via the plenum (via a hole in the panel).

Two acoustic panels (at least one being an illuminating panel) are for example abutting, and each one may comprise at least one electrical contact zone on a border of the inner face extending over the edge which is abutting said other edge of the other panel with another electrical contact zone on the other edge extending along a border of the inner face of this other panel. It is possible to have two, three or four electrical contact zones, in particular each panel is abutting one, two, three or four panels.

In the ceiling, it is possible to replace some illuminating acoustic panels with acoustic panels without lighting sources (at least without an OLED module) but while keeping the electrical contacts. Thus, an electrical continuity for transmitting any electrical (power supply, data, control) signal is achieved panel by panel.

The features and advantages of the invention will become apparent in the following description of three embodiments of an acoustic absorbent element and of a ceiling assembly according to the invention, which is given solely by way of example and with reference to the appended drawings, in which:

each FIGS. 1, 2, 3 and 3' is a schematic front view of the room side (inner face) of an acoustic and illuminating ceiling panel with conventional visible framework comprising an assembly of the acoustic and illuminating ceiling panels in accordance with embodiments of the invention;

each FIGS. 4a, 4b and 4c is a schematic front view of the room side (inner face) of an acoustic and illuminating ceiling panel in accordance with embodiments of the invention;

Figure 1:
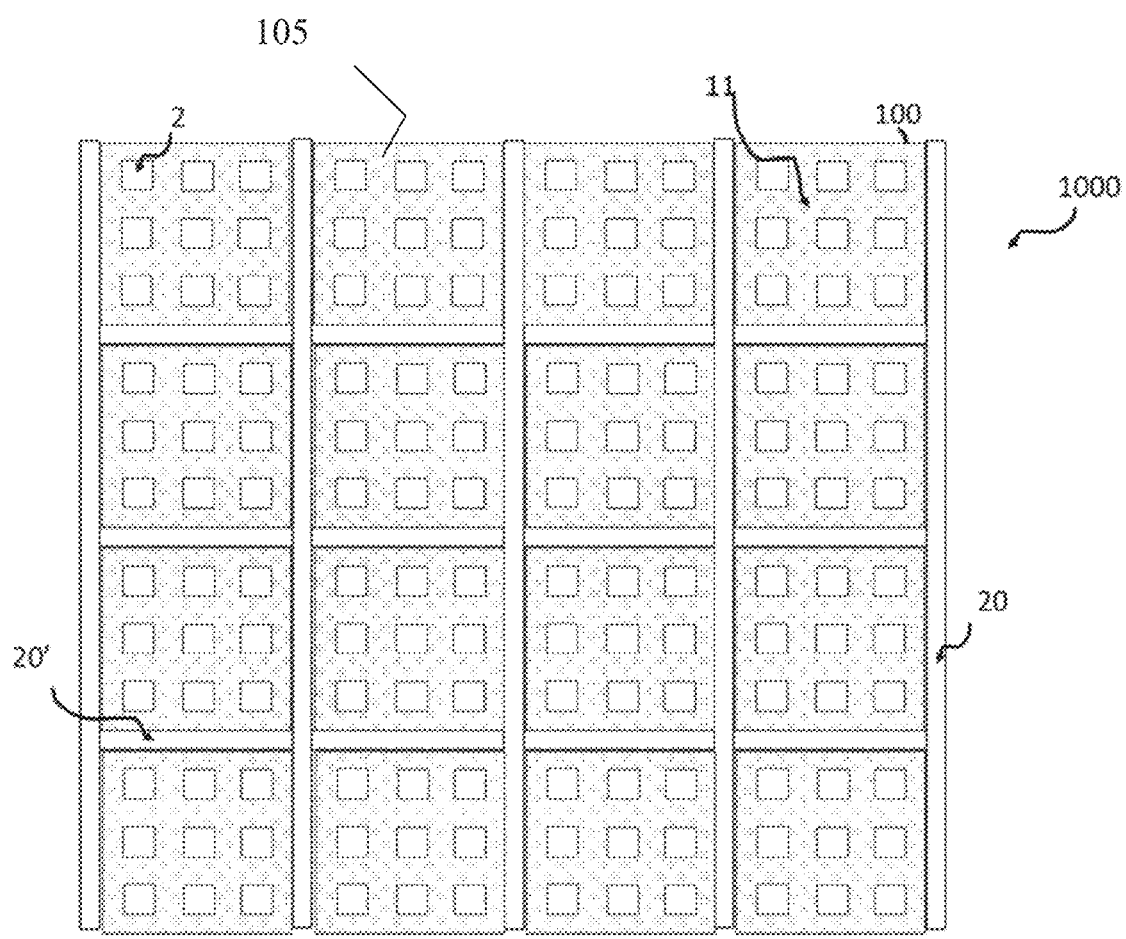
Figure 2:
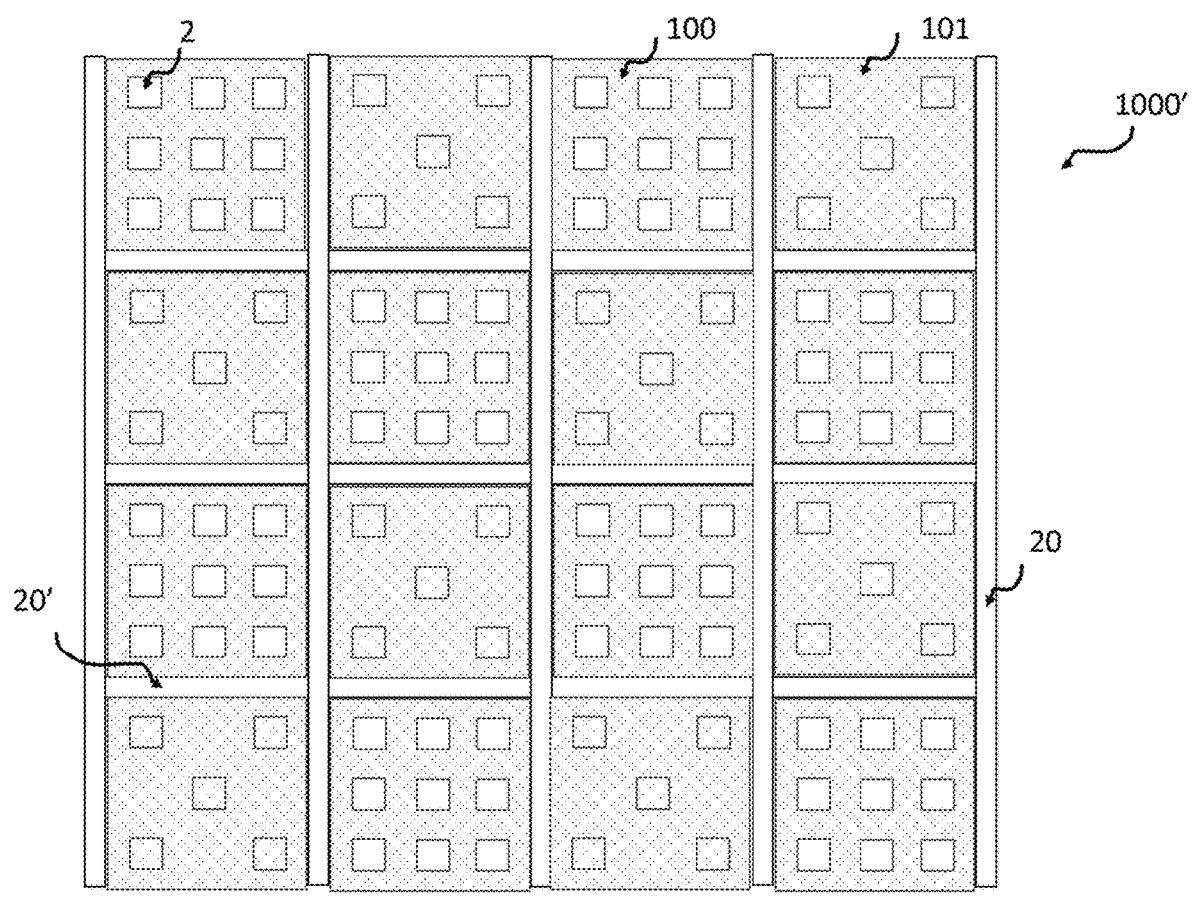
Figure 3:
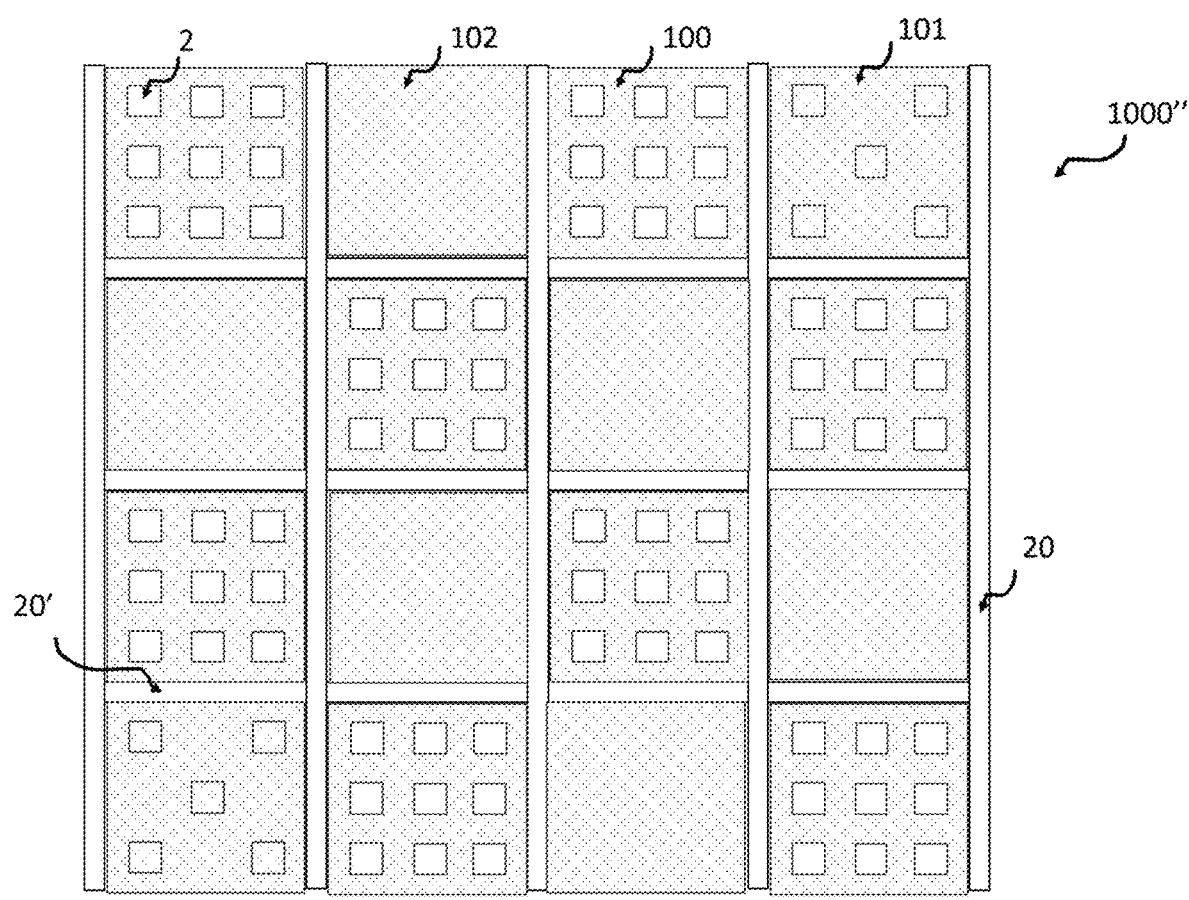
Figure 3:
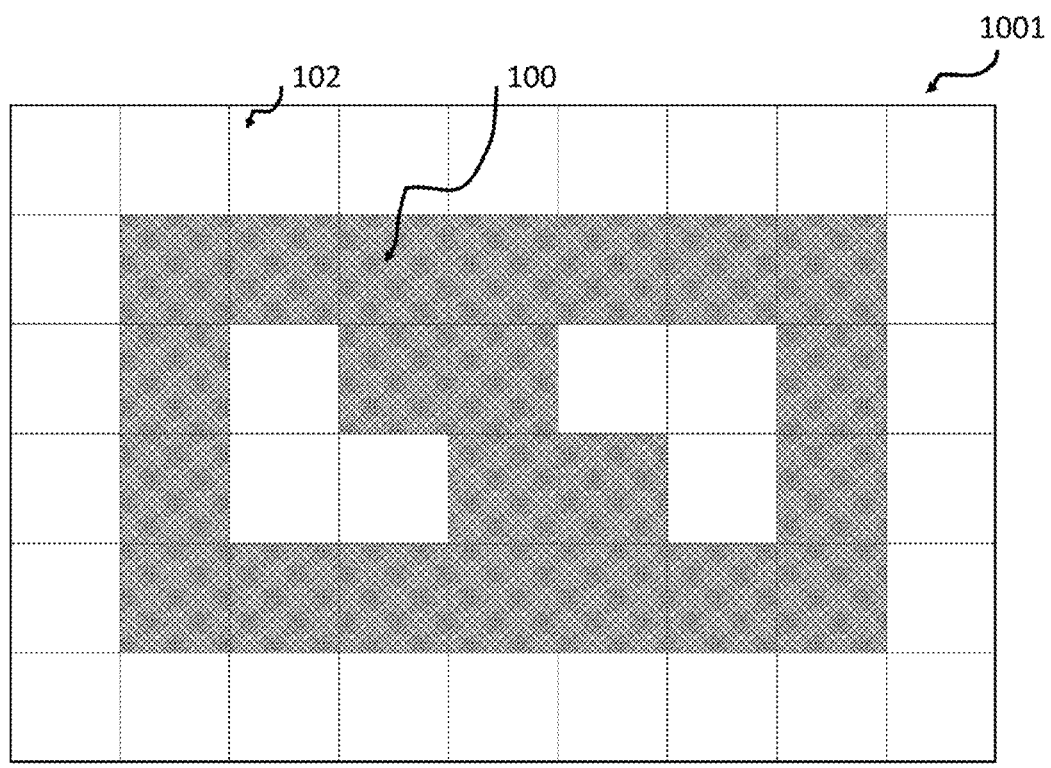

For the sake of clarity, the relative dimensions of the various elements have not been strictly respected, in particular in FIGS. 1, 2 and 3.

The ceiling 1000 represented in FIG. 1, in accordance with a first embodiment of the invention, comprises 16 illuminating acoustic ceiling panels 100, suspended from the ceiling of the room by means of hangers 20, 20' forming a grid.

The illuminating acoustic panel 100, here of square shape, of 600 mm by 600 mm, preferably comprises a layer of acoustic absorbent material 105 with an inner face (which is bare or coated with layer(s) for example with a voile fabric and with a layer of paint 106a) oriented toward the room bearing 9 OLED modules 2 that are separated and regularly distributed (Lambertian source preferably emitting in the white), that are rectangular (square) here, preferably of less than 20 cm by less than 20 cm, for example 10 cm by 10 cm. By way of example, in this first embodiment, it is a panel with a layer consisting of compressed mineral wool and painted white, having a thickness of 40 mm. Alternatively, the layer is a layer of rock wool having a density of 60 kg/m$^3$ and a thickness of 30 mm. The panel may also be a "wet felt".

Each OLED module 2 is for example received in a blind opening made in the thickness of the layer between the main inner face 11 and the main outer face of the layer 3. It is a notch made on the inner face side. The OLED modules 2 are for example connected via the rear (outer main face side) to a power supply present in the building.

A through-hole in the thickness of the layer may be made for the power supply.

The OLED modules 2 may be flush with the inner face outside of the notch. The OLED modules 2 occupy 25% of the surface area of the panel.

The acoustic panels occupy 100% of the ceiling here. With a luminance of 3000 cd/m², the lighting obtained is of the order of 1355 lux, which is very high. It is preferred to reduce the luminance and/or the number of OLED modules (for example to 4) better still preferably the number of illuminating panels is reduced in favor of conventional panels.

The ceiling 1000' represented in FIG. 2, in accordance with a second embodiment of the invention, comprises two series of 8 illuminating acoustic ceiling panels 100,101 (alternating series), suspended from the ceiling of the room by means of hangers 20,20' forming a grid.

In the first series, as in FIG. 1, the illuminating acoustic panel 100, here of square shape, of 600 mm by 600 mm, bears 9 OLED modules 2 that are separated and regularly distributed, here that are rectangular (square), preferably of less than 20 cm by less than 20 cm, for example of 10 cm by 10 cm.

In the second series, the illuminating acoustic panel 101, here of square shape, of 600 mm by 600 mm, bears 5 OLED modules 2 that are separated and distributed like the 5 side of a die, here rectangular (square) OLEDs, preferably of less than 20 cm by less than 20 cm, for example of 10 cm by 10 cm.

The ceiling 1000" represented in FIG. 3, in accordance with one embodiment of the invention, comprises some illuminating acoustic ceiling panels 100, 101 and some conventional ceiling panels 102 (conventional and illuminating panels in alternation), suspended from the ceiling of the room by means of hangers 20,20' forming a grid. The hangers 20 are fastened for example to the ends of the two hanger bars attached to an outer surface (not visible) of the panel.

In the first series, as in FIG. 1, the illuminating acoustic panel 100, here of square shape, of 600 mm by 600 mm, bears 9 OLED modules 2 that are separated and regularly distributed, here that are rectangular (square), preferably of less than 20 cm by less than 20 cm, for example of 10 cm by 10 cm. If the panels are numbered from the first line (from left to right) down to the last line, these are the panels nos. 1, 3, 6, 8, 9, 11, 14 and 16.

In the second series, the illuminating acoustic panel 101, here of square shape, of 600 mm by 600 mm, bears 2 OLED modules 2 that are separated and distributed like the 5 side of a die, here rectangular (square) OLEDs, preferably of less than 20 cm by less than 20 cm, for example of 10 cm by 10 cm. These are the panels nos. 4 and 13.

There are six conventional acoustic panels 102. These are the panels nos. 2, 5, 7, 10, 12 and 15.

The following table 1 indicates, for rectangular (square) OLED modules of 10 cm by 10 cm and with a luminance of 3000 cd/m², the illumination in lux as a function of the % of surface area occupied by all of the OLED modules in the ceiling (or in a given region of the ceiling).

In FIG. 8, the preferred range is a (bold) box with an illumination between 300 lux and 843 lux.

The embodiments that are even more preferred are highlighted.

The following table 2 indicates, for rectangular OLED modules having various surface area sizes and a luminance of 3000 cd/m², a possible number of OLEDs per panel. The technical edges are for example at most 1 mm.

TABLE 2

| Size | Number of OLEDs per panel | | | | | |
|---|---|---|---|---|---|---|
| | 9 | 8 | 7 | 6 | 5 | 4 |
| 10 cm × 10 cm | | | | | | |
| Surface area occupied on the panel | 0.250 | 0.222 | 0.194 | 0.167 | 0.139 | 0.111 |
| Flux per panel (lm) | 675 | 600 | 525 | 450 | 375 | 300 |

Table 1

The ceiling 1001 represented in FIG. 3', in accordance with one preferred embodiment in connection with FIG. 8 (and table 1, first row), comprises, in a rectangular room of 5.4 m by 3.6 m approximately, 54 acoustic ceiling panels 100, 102, each of 600 mm by 600 mm including:

22 illuminating panels 100 with OLED modules of 10 cm by 10 cm with 3000 cd/m²;

and 32 conventional panels 102, 26 of which form a peripheral frame and 6 forming two L shapes (with three panels) spaced apart by two illuminating panels.

This corresponds to a degree of coverage of 40% of the ceiling for the illuminating panels.

OLED modules of 10 cm by 10 cm are chosen for example as distributed in the following FIG. 4a, 4b or 4c.

The ceiling obtained is efficient both acoustically (class A) and in terms of lighting (at least 300 lux).

Figures 4A, 4B, 4C:
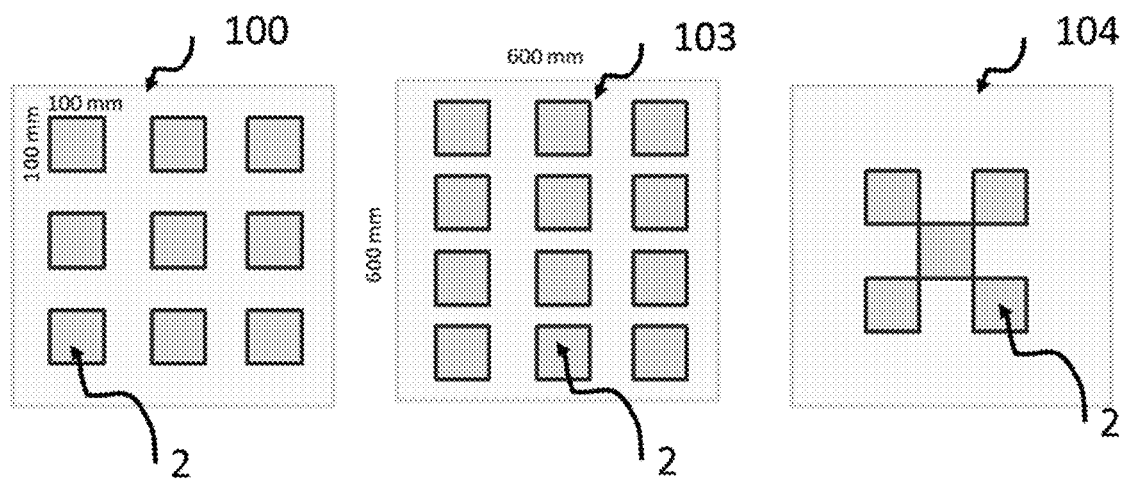

FIG. 4a is a schematic (inner face) front view of the room side of an acoustic and illuminating ceiling panel 103 in accordance with the invention having 9 OLED modules 2 that are separated and regularly distributed (Lambertian source preferably emitting in the white), that are rectangular (square) here, preferably of less than 20 cm by less than 20 cm, for example of 10 cm by 10 cm.

FIG. 4b is a schematic (inner face) front view of the room side of an acoustic and illuminating ceiling panel 103 in accordance with the invention having 12 OLED modules 2 that are separated and regularly distributed (Lambertian source preferably emitting in the white), that are rectangular (square) here, preferably of less than 20 cm by less than 20 cm, for example of 10 cm by 10 cm.

FIG. 4c is a schematic (inner face) front view of the room side of an acoustic and illuminating ceiling panel 104 in accordance with the invention having 5 OLED modules 2 that are in contact only by the corners (via one corner here) at the center of the panel (Lambertian source preferably emitting in the white), that are rectangular (square) here, preferably of less than 20 cm by less than 20 cm, for example of 10 cm by 10 cm.

Figure 5:
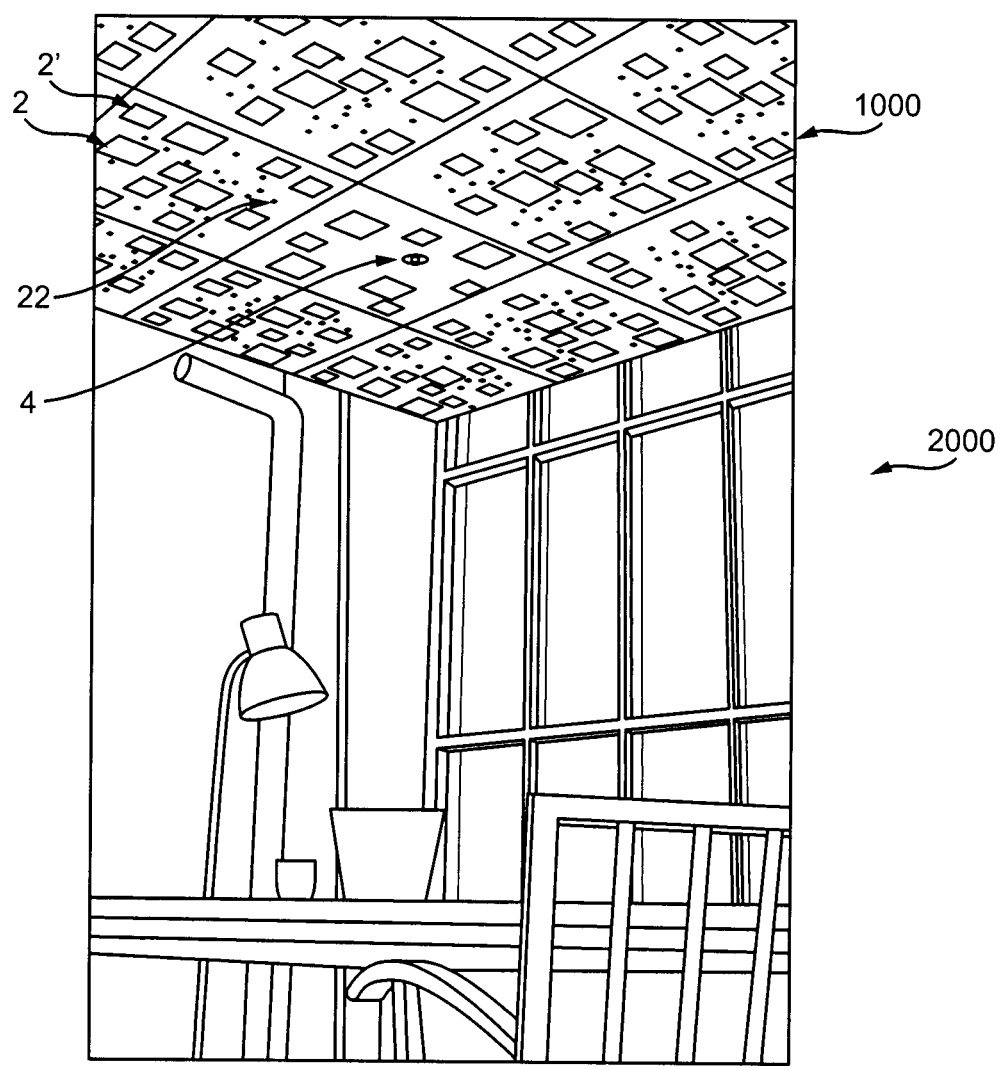
FIG. 5 is a partial side view (photo) in perspective of a room with an acoustic and illuminating ceiling with concealed framework comprising an assembly of the acoustic and illuminating ceiling panels in accordance with the invention.

FIG. 5 is a partial side view (photo) in perspective of a room 2000 with an acoustic and illuminating ceiling 1000 with concealed metal (steel, etc.) framework (in particular concealed in a longitudinal notch on the edge of the panels) comprising an assembly of the acoustic and illuminating ceiling panels with abutting edges, which panels are in accordance with the invention.

This may be a ceiling such as the Focus Ds from Ecophon. Each panel comprises OLED modules 2, 2' in two sizes, for example 10 cm by 10 cm and 5 cm by 5 cm and even also LEDs 22 and even a control unit 4 for example mains powered by the plenum (via a hole in the panel).

Figure 6A:
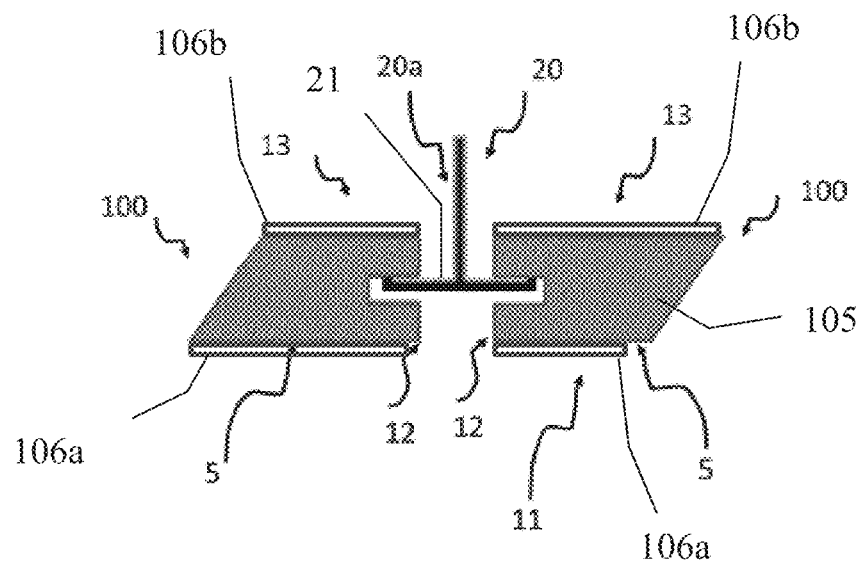
FIG. 6a is a partial schematic cross-sectional view of two panels with their framework that is also used for the electrical interconnection.
Figure 6B:
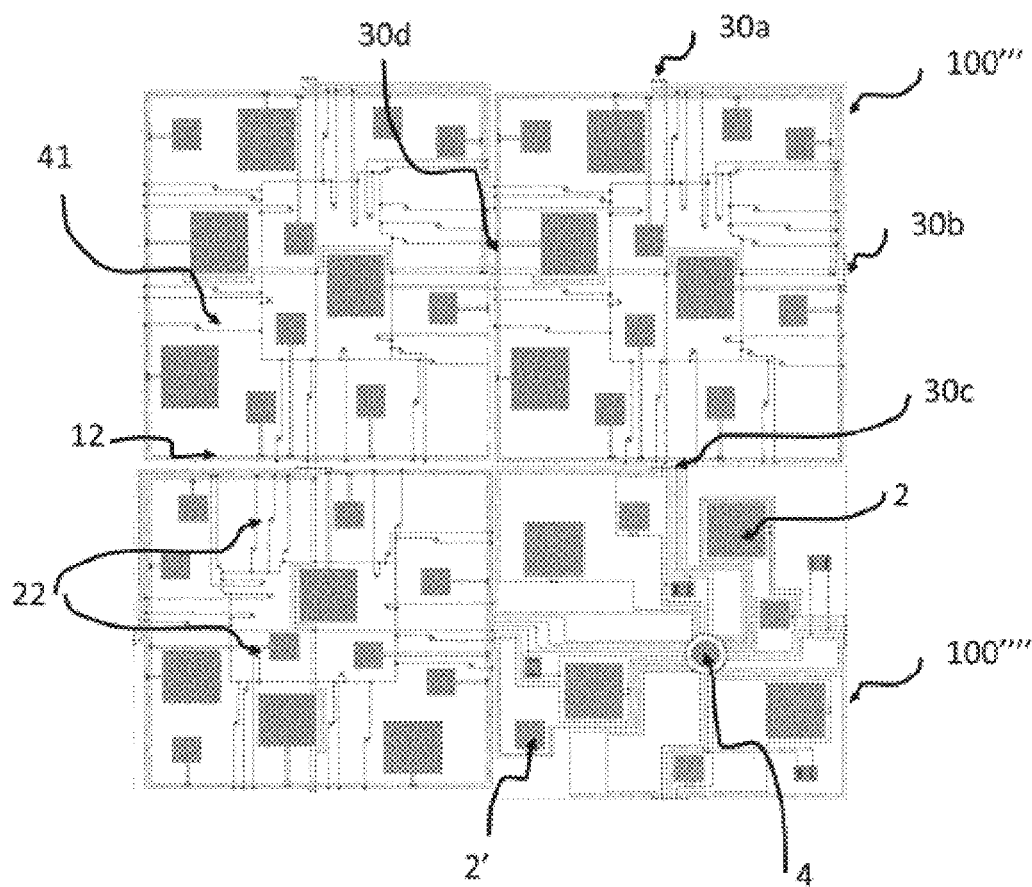
FIG. 6b is a partial front view (photo) of the room side (inner face) of an acoustic and illuminating ceiling panel with concealed framework comprising an assembly of the acoustic and illuminating ceiling panels in accordance with the invention that are abutting.

As indicated in FIG. 6b, showing four abutting acoustic and illuminating panels 100''',100'''', each may comprise four electrical contact zones 30a, 30b, 30c, 30d on the four borders of the inner face and extending over the edges 12.

Thus, an electrical continuity for transmitting any electrical (power supply, data, control) signal is achieved panel by panel.

It is possible to replace some panels with panels without lighting sources but to keep the electrical contacts.

Also shown are the conductive pathways 41 (the thinnest possible wires or strips) leading to the OLEDs, to the LEDs or to the control unit 4.

In one alternative shown in FIG. 6a, the edges 12 are not in contact, and two acoustic panels 100 (at least one being illuminating according to the invention) are suspended by a T-shape metal framework 20 (bar of the T toward the plenum, exterior side of the room) here covered with an electrical conductor 20a on the side oriented with the outer face 13 on the plenum side. The metal framework 20 comprises an electrically conductive zone 21 oriented toward the outer face 13 capable of electrically interconnecting said acoustic panels.

Each panel comprises a layer of acoustic absorbent material 105 and has the inner face 11 with electrical contacts 5 extending over the edges 12, then in connection with the electrical conductor 20a. The panel 100 also comprises an acoustic surfacing including a voile fabric 106b on the outer face 13 on the side opposite the main inner face 11.

The inner face 11 may have a textile 5 fastened by any means, local or extensive, and extending to the edge 12 including into a longitudinal notch (rectangular section in side profile here) bearing electrical conductors such as metal wires preferably of at most 5 mm, or 2 mm, or 1 mm extending up to the electrical contacts. Here the edges 12 are not in contact.

Figure 7:
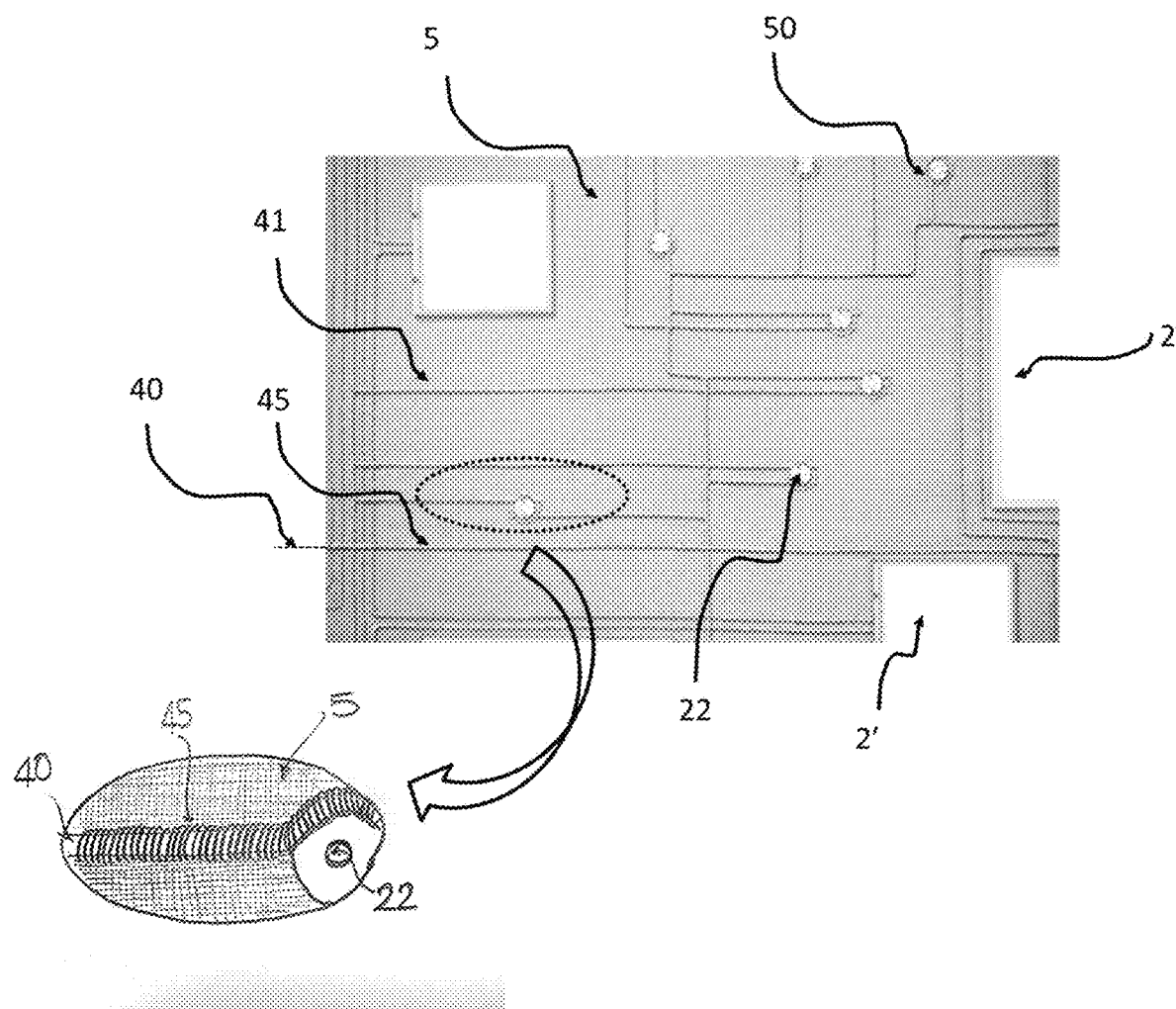
FIG. 7 is a detail view and front view showing, on an inner face, electrically conductive threads and embroidered masking textile threads, and FIG. 8 indicates, for rectangular (square) OLED modules of 10 cm and with a luminance of 3000 cd/m$^2$, the illumination in lux as a function of the % of surface area occupied by all of the OLED modules in the ceiling (or in a given region of the ceiling).

FIG. 7 is a detail view and front view of a panel according to the invention showing, on an inner face 11, a textile bearing electrically conductive threads 41 embroidered or sewn on top and textile threads 45 embroidered or sewn for masking electrically conductive threads (see the zoom) conveying the signals to the OLEDs 2, 2' of different sizes or several LEDs 22. Beneath the LEDS there may be textile reinforcing zones 50 or contact zones or zones for marking the positioning of the LEDS.

The invention is not limited to the examples described and represented.

The invention claimed is:

1. An acoustic and illuminating ceiling panel comprising a layer of acoustic absorbent material, the layer comprising a main inner face intended to be pointed toward the inside of the room, and light sources on the main inner face, wherein said light sources comprise organic light-emitting diode (OLED) modules with a luminous efficacy greater than or equal to 60 lm/W, and wherein a number and size of the OLED modules are adapted so that the ceiling panel provides an acoustic absorption coefficient aw greater than or equal to 0.7, wherein the main inner face comprises a textile bearing electrically conductive threads having a diameter of at most 1 mm, having a low-voltage power supply of at most 50 V, for said OLED modules, said OLED modules being on said textile in electrical contact with the electrically conductive threads.

2. The acoustic and illuminating ceiling panel as claimed in claim 1, wherein the ceiling panel complies with class A according to the standard EN ISO 11654.

3. The acoustic and illuminating ceiling panel as claimed in claim 1, wherein the OLED modules are in contact via the corners only or are spaced apart from one another.

4. The acoustic and illuminating ceiling panel as claimed in claim 1, wherein a combined degree of coverage of said OLED modules is at most 30%.

5. The acoustic and illuminating ceiling panel as claimed in claim 1, wherein the OLED modules are uniformly distributed over the inner face.

6. The acoustic and illuminating ceiling panel as claimed in claim 1, wherein the OLED modules each have a luminance of at least 2500 cd/m$^2$ and an active surface area of at least 0.02 m$^2$ and of at most 0.29 m$^2$ and wherein a number of said OLED modules on the panel is at least 5 and at most 50.

7. The acoustic and illuminating ceiling panel as claimed in claim 1, wherein said organic light-emitting diode (OLED) modules comprises a first series of OLED modules, and a second series of OLED modules of smaller active surface area.

8. The acoustic and illuminating ceiling panel as claimed in claim 1, wherein arranged on the main inner face is a plurality of inorganic light-emitting diodes (LEDs), which are spaced apart from one another.

9. The acoustic and illuminating ceiling panel as claimed in claim 1, wherein the electrically conductive threads are covered by additional textile threads.

10. The acoustic and illuminating ceiling panel as claimed in claim 1, comprising a first zone of at least two electrical contacts on a first border of the main inner face and extending over a first edge of the panel.

11. The acoustic and illuminating ceiling panel as claimed in claim 1, wherein the textile comprises at least one reinforcing zone and/or one positioning marker of one of said OLED modules or of an LED or of another electronic component.

12. The acoustic and illuminating ceiling panel as claimed in claim 1, comprising an acoustic surfacing including a voile fabric on the outer face on a side opposite the main inner face.

13. An acoustic ceiling comprising a plurality of acoustic and illuminating ceiling panels as claimed in claim 1 providing an illumination of at least 300 lux and of at most 900 lux.

14. An acoustic ceiling comprising a plurality of acoustic ceiling panels wherein, in a region of the ceiling defined by at least 9 panels or over the whole of the ceiling, the acoustic ceiling comprises acoustic and illuminating ceiling panels as claimed in claim 1.

15. An acoustic ceiling comprising a plurality of acoustic ceiling panels wherein, in a reference region of the ceiling defined by at least 9 panels or over the whole of the ceiling, the surface occupied by acoustic and illuminating ceiling panels as claimed in claim 1 is at most 70% of the reference surface.

16. An acoustic ceiling comprising a plurality of acoustic ceiling panels as claimed in claim 1, wherein two adjacent and separated panels comprise, on their respective edges that are opposite, electrical contacts that are in electrical connection with a metal framework that comprises an electrically conductive zone oriented toward the outer face capable of electrically interconnecting said acoustic panels.

17. An acoustic ceiling comprising a plurality of acoustic ceiling panels as claimed in claim 1, wherein a first edge of a first acoustic panel is in contact with a second edge of a second acoustic panel, the first and second edges bearing electrical contacts that form an electrical continuity by contact for the transmission of control, power supply or data signals.

18. The acoustic and illuminating ceiling panel as claimed in claim 1, wherein the main inner face is covered by a voile fabric and/or coated with a paint.

19. An acoustic and illuminating ceiling panel comprising a layer of acoustic absorbent material, the layer comprising a main inner face intended to be pointed toward the inside of the room, and light sources on the main inner face, wherein said light sources comprise organic light-emitting diode (OLED) modules with a luminous efficacy greater than or equal to 60 lm/W, wherein the main inner face comprises a textile bearing electrically conductive threads, having a low-voltage power supply of at most 50 V, for said OLED modules, said OLED modules being on said textile in electrical contact with the electrically conductive threads.

20. The acoustic and illuminating ceiling panel as claimed in claim 19, wherein the electrically conductive threads have a diameter of at most 1 mm.

\* \* \* \* \*